US012695031B2

(12) United States Patent
Lu et al.

(10) Patent No.: US 12,695,031 B2
(45) Date of Patent: Jul. 28, 2026

(54) CYLINDRICAL CAPACITOR

(71) Applicant: NANYA TECHNOLOGY CORPORATION, New Taipei city (TW)

(72) Inventors: Chun Lin Lu, New Taipei City (TW); Kai Hung Lin, New Taipei City (TW)

(73) Assignee: NANYA TECHNOLOGY CORPORATION, New Taipei City (TW)

( * ) Notice: Subject to any disclaimer, the term of this patent is extended or adjusted under 35 U.S.C. 154(b) by 118 days.

(21) Appl. No.: 18/618,987

(22) Filed: Mar. 27, 2024

(65) Prior Publication Data

US 2025/0308774 A1 Oct. 2, 2025

(51) Int. Cl.
| | |
|---|---|
| *H01G 4/28* | (2006.01) |
| *H01G 4/008* | (2006.01) |
| *H01G 4/01* | (2006.01) |
| H01G 4/10 | (2006.01) |

(52) U.S. Cl.
CPC ............... *H01G 4/28* (2013.01); *H01G 4/008* (2013.01); *H01G 4/01* (2013.01); *H01G 4/10* (2013.01)

(58) Field of Classification Search
None
See application file for complete search history.

(56) References Cited

U.S. PATENT DOCUMENTS

| | | | | |
|---|---|---|---|---|
| 4,109,292 A | * | 8/1978 | Shibayama | H01G 4/008 361/306.1 |
| 2018/0374644 A1 | * | 12/2018 | Stollwerck | H01G 4/258 |
| 2019/0237260 A1 | * | 8/2019 | Stollwerck | H01G 4/258 |
| 2019/0378657 A1 | * | 12/2019 | Lu | H01G 4/005 |
| 2023/0225112 A1 | * | 7/2023 | Park | H10D 1/694 |

FOREIGN PATENT DOCUMENTS

TW      202331933 A    8/2023

OTHER PUBLICATIONS

Arnaud Valour et al., "Optical, electrical and mechanical properties of TiN thin film obtained from a TiO2 sol-gel coating and rapid thermal nitridation", Surface & Coatings Technology, vol. 413, 2021. (ref.01, file attached).

* cited by examiner

*Primary Examiner* — Eric W Thomas
(74) *Attorney, Agent, or Firm* — CKC & Partners Co., LLC

(57) ABSTRACT

The present disclosure provides a cylindrical capacitor. The cylindrical capacitor includes a first electrode, a dielectric layer, and a second electrode. The first electrode has a shape of a hollow cylinder and includes oxidized surface portions, first metal-containing layers, and a first hard layer. The oxidized surface portions are at cylindrical surfaces of the hollow cylinder of the first electrode. The first metal-containing layers are between the oxidized surface portions. The first hard layer is disposed between the first metal-containing layers, and a hardness of the first hard layer is larger than hardnesses of the oxidized surface portions and the first metal-containing layers. The dielectric layer is disposed on the first electrode. The second electrode is disposed on the dielectric layer.

10 Claims, 10 Drawing Sheets

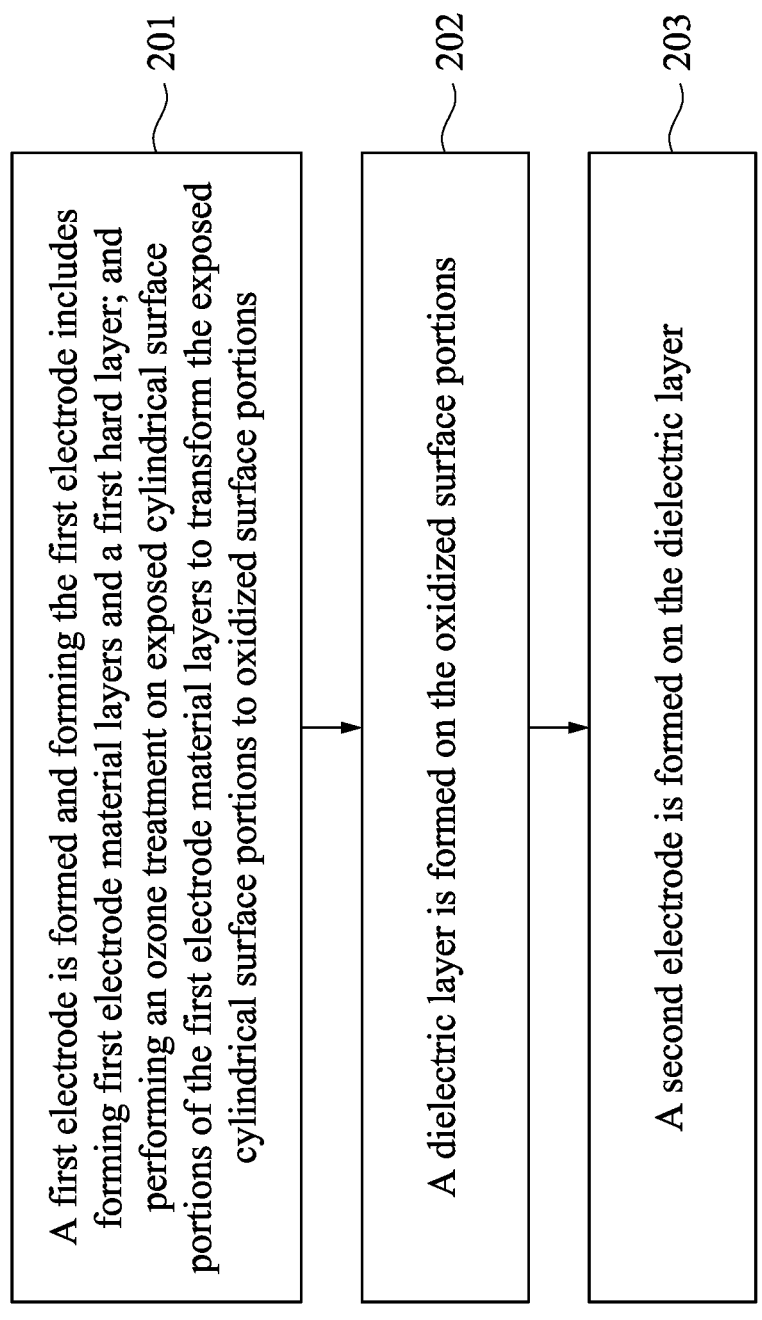

200

201 A first electrode is formed and forming the first electrode includes forming first electrode material layers and a first hard layer; and performing an ozone treatment on exposed cylindrical surface portions of the first electrode material layers to transform the exposed cylindrical surface portions to oxidized surface portions 202 A dielectric layer is formed on the oxidized surface portions 203 A second electrode is formed on the dielectric layer

CYLINDRICAL CAPACITOR

BACKGROUND

Field of Invention

The present disclosure relates to a cylindrical capacitor and a method of forming the same.

Description of Related Art

Capacitors are widely used in semiconductor devices, for example, dynamic random access memory (DRAM). However, as the size of the semiconductor device is manufactured to become smaller and smaller, having the capacitor with improved capacitance and reduced leakage becomes challenging. Therefore, it is necessary to develop a capacitor and a method of forming the same that satisfies every aspect.

SUMMARY

The present disclosure provides a cylindrical capacitor. The cylindrical capacitor includes a first electrode, a dielectric layer, and a second electrode. The first electrode has a shape of a hollow cylinder and includes oxidized surface portions, first metal-containing layers, and a first hard layer. The oxidized surface portions are at cylindrical surfaces of the hollow cylinder of the first electrode. The first metal-containing layers are between the oxidized surface portions. The first hard layer is disposed between the first metal-containing layers, and a hardness of the first hard layer is larger than hardnesses of the oxidized surface portions and the first metal-containing layers. The dielectric layer is disposed on the first electrode. The second electrode is disposed on the dielectric layer.

In some embodiments, the first hard layer includes a silicon layer, a carbon layer, an aluminum layer, or combinations thereof.

In some embodiments, the first metal-containing layers include titanium nitride, titanium silicon nitride, or a combination thereof, and the oxidized surface portions include titanium oxynitride, titanium oxide, titanium silicon oxynitride, or combinations thereof.

In some embodiments, the first hard layer is away from the cylindrical surfaces of the hollow cylinder of the first electrode with distances which are from 0.4 to 0.6 times a thickness of the first electrode.

In some embodiments, the thickness of the first electrode is from 40 Å to 100 Å.

In some embodiments, a ratio of a thickness of the first hard layer to a total thickness of the oxidized surface portions and the first metal-containing layers is from 0.02 to 0.3.

In some embodiments, the first hard layer is separated from the oxidized surface portions by the first metal-containing layers.

In some embodiments, the oxidized surface portions are in direct contact with the dielectric layer, and the first metal-containing layers and the first hard layer are separated from the dielectric layer by the oxidized surface portions.

In some embodiments, a thickness of each of the oxidized surface portions is from 5 Å to 10 Å.

In some embodiments, the second electrode includes second metal-containing layers and a second hard layer between the second metal-containing layers, and a hardness of the second hard layer is larger than hardnesses of the second metal-containing layers.

The present discloser also provides a method of forming a cylindrical capacitor. The method includes the following operations. A first electrode is formed and forming the first electrode includes forming first electrode material layers and a first hard layer stacking with each other in hollow cylindrical shapes, in which the first hard layer is disposed between the first electrode material layers; and performing an ozone treatment on exposed cylindrical surface portions of the first electrode material layers to transform the exposed cylindrical surface portions to oxidized surface portions, in which a hardness of the first hard layer is larger than hardnesses of the first electrode material layers and the oxidized surface portions. A dielectric layer is formed on the oxidized surface portions. A second electrode is formed on the dielectric layer.

In some embodiments, forming the first electrode material layers and the first hard layer stacking with each other in the hollow cylindrical shapes includes forming the first electrode material layers and the first hard layer on a cylinder substrate, and the method further includes removing the cylinder substrate before performing the ozone treatment.

In some embodiments, before performing the ozone treatment, a ratio of a thickness of the first hard layer to a total thickness of the first electrode material layers is from 0.02 to 0.3.

In some embodiments, the ozone treatment is performed at a temperature from 220° C. to 270° C.

In some embodiments, the ozone treatment is performed at a temperature from 220° C. to 245° C.

In some embodiments, the ozone treatment is performed by using ozone, and a density of the ozone is from 200 g/m$^3$ to 300 g/m$^3$.

In some embodiments, after performing the ozone treatment, a thickness of each of the oxidized surface portions is from 5 Å to 10 Å.

In some embodiments, after forming the first electrode, the first electrode has a shape of a hollow cylinder, and the first hard layer is away from cylindrical surfaces of the hollow cylinder of the first electrode with distances which are from 0.4 to 0.6 times a thickness of the first electrode.

In some embodiments, forming the second electrode includes forming second electrode material layers and a second hard layer stacking with each other on the dielectric layer, in which the second hard layer is disposed between the second electrode material layers and a hardness of the second hard layer is larger than hardnesses of the second electrode material layers.

In some embodiments, the method further includes oxidizing an exposed portion of the second electrode material layers after forming the second electrode material layers and the second hard layer.

BRIEF DESCRIPTION OF THE DRAWINGS

The present disclosure can be more fully understood by reading the following detailed description of the embodiments, with reference made to the accompanying figures as follows.

FIG. 2 is a flow chart of a method forming a cylindrical capacitor according to some embodiments of the present disclosure.

DETAILED DESCRIPTION

To make the description of the present disclosure detailed and complete, the following is an illustrative description of the aspects of the embodiments. This is not to limit the embodiments of the present disclosure to only one form. The embodiments of the present disclosure may be combined or substituted with each other when it is beneficial, and other embodiments may be added without further explanation.

In addition, spatially relative terms, such as below and above, etc., may be used in the present disclosure to describe the relationship between one element (or feature) to another element (or feature) in the figures. In addition to the orientation depicted in the figures, spatially relative terms are intended to encompass different orientations of the device in use or in operation. For example, the device may be oriented otherwise (e.g., rotated at 90 degrees), and the spatially relative terms can be interpreted accordingly. In the present disclosure, unless otherwise indicated, the same element numbers in different figures refer to the same or similar elements formed from the same or similar materials by the same or similar methods.

The terms "around", "approximately", "nearly", "basically", "substantially", etc., used in the present disclosure include the stated values (or characteristics) and a deviation of the stated values (or characteristics) understood by one skilled in the art. For example, considering the errors of the values (or characteristics), these terms may indicate the values within one or more standard deviations (e.g., the values within ±30%, 20%, 15%, 10%, or +5%), or may indicate the characteristics including the deviation from the practical operation (e.g., the "substantially parallel" may indicate close to parallel in practical, rather than a perfect ideally parallelism). Furthermore, it is possible to select an acceptable range of the deviation according to the nature of the measurement or other properties, instead of applying only one single deviation range to all the values (or characteristics).

Figure 1A:
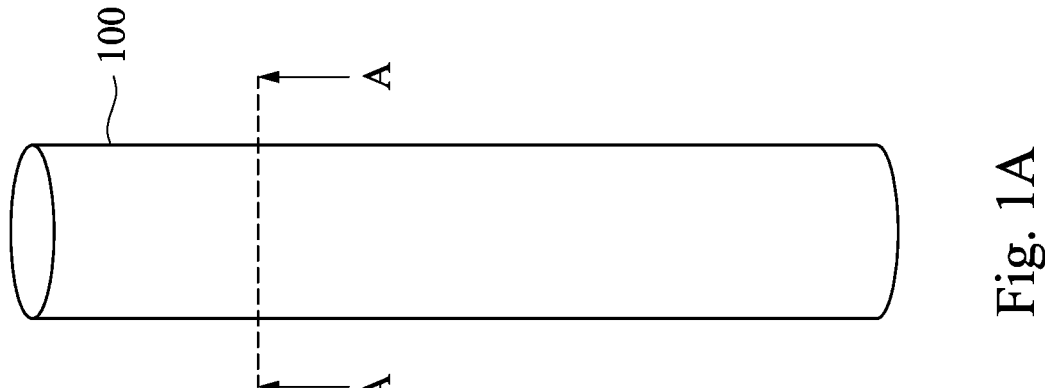
FIG. 1A is an isometric view of a cylindrical capacitor according to some embodiments of the present disclosure.
Figure 1B:
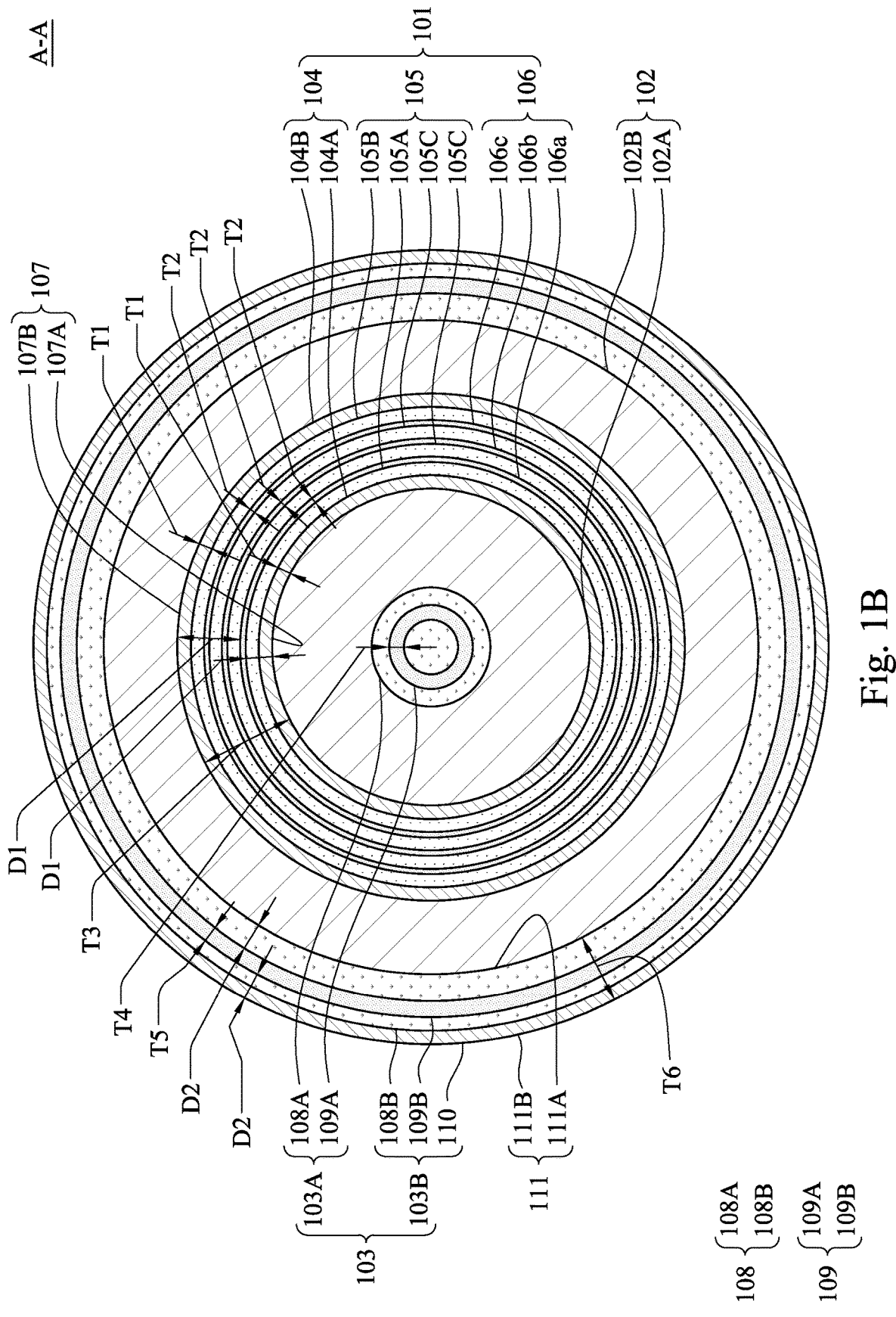
FIG. 1B is a cross-sectional view of a cylindrical capacitor according to some embodiments of the present disclosure.
Figure 3:
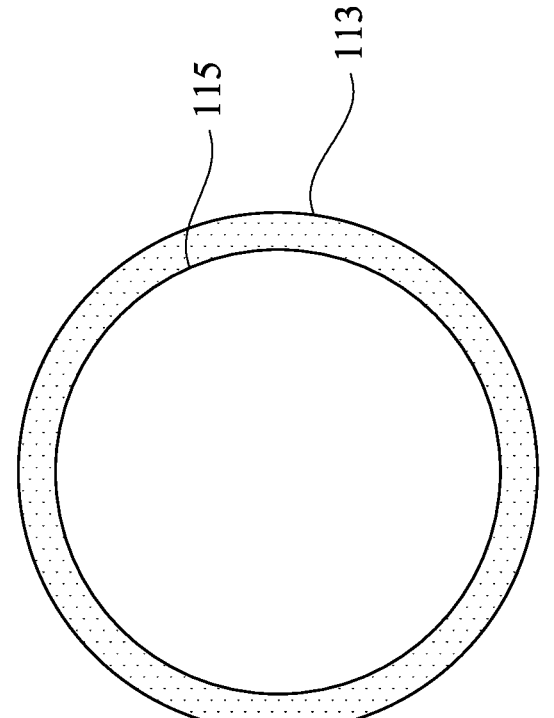
FIGS. 3 to 9 are cross-sectional views of the structures of the cylindrical capacitor during the formation of the cylindrical capacitor by the method according to some embodiments of the present disclosure.
Figure 4:
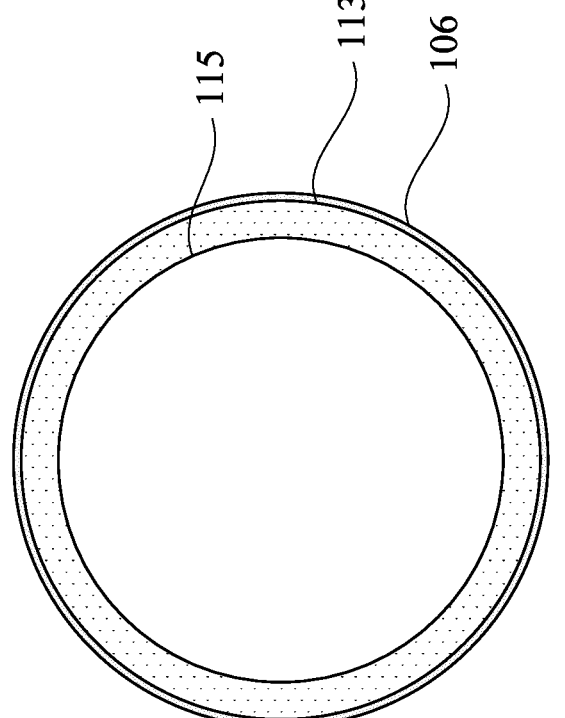
Figure 5:
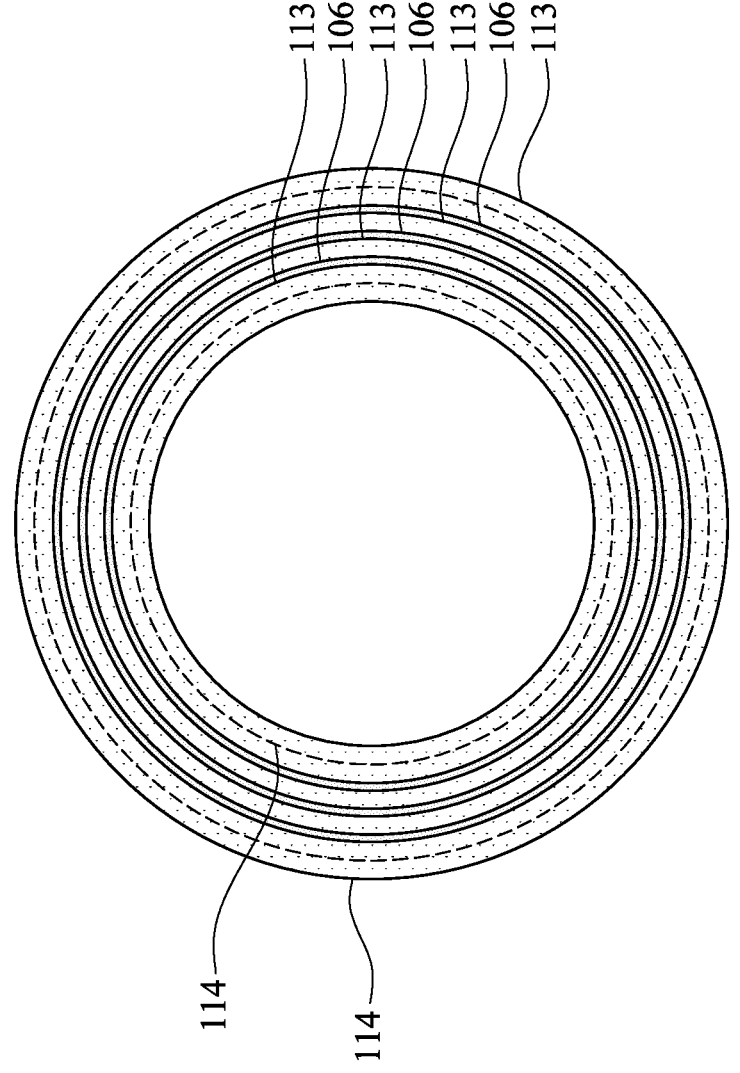
Figure 6:
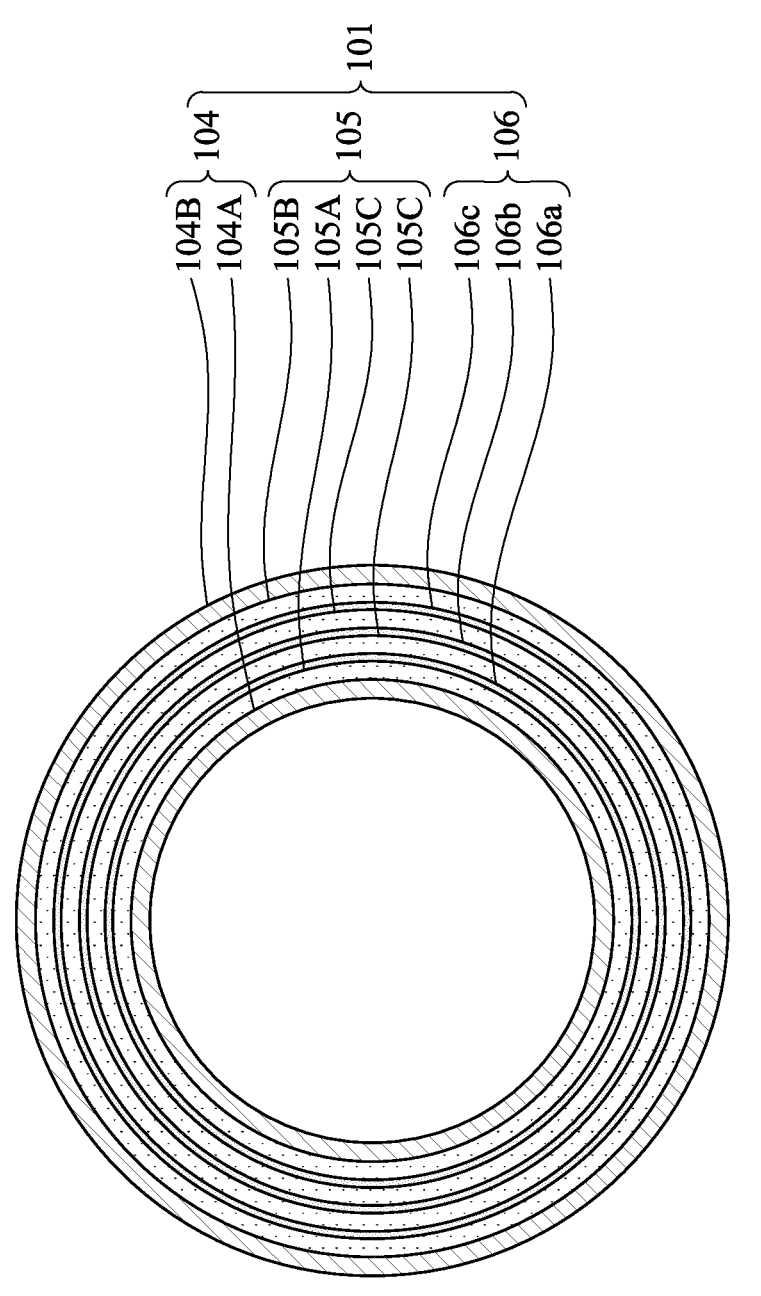

The present disclosure provides a cylindrical capacitor 100, as shown in FIGS. 1A and 1B, in which FIG. 1B is a cross-sectional view of FIG. 1A along a line A-A. The cylindrical capacitor 100 includes a first electrode 101, a dielectric layer 102, and a second electrode 103. The first electrode 101 has a shape of a hollow cylinder and includes oxidized surface portions 104, first metal-containing layers 105, and a first hard layer 106. The oxidized surface portions 104 are at cylindrical surfaces 107 of the hollow cylinder of the first electrode 101. The first metal-containing layers 105 are between the oxidized surface portions 104. The first hard layer 106 is disposed between the first metal-containing layers 105, and a hardness of the first hard layer 106 is larger than hardnesses of the oxidized surface portions 104 and the first metal-containing layers 105. The dielectric layer 102 is disposed on the first electrode 101. The second electrode 103 is disposed on the dielectric layer 102. The cylindrical capacitor 100 is described in detail in the following embodiments.

The first electrode 101 has a shape of the hollow cylinder and may be referred to as a bottom electrode of the cylindrical capacitor 100. The first electrode 101 includes the oxidized surface portions 104, the first metal-containing layers 105, and the first hard layer 106 in hollow cylindrical shapes. The oxidized surface portions 104 reduce the current leakage of the cylindrical capacitor 100. The first metal-containing layers 105 are main conductive portions of the first electrode 101 and are remaining portions of the first electrode 101 in addition to the oxidized surface portions 104 and the first hard layer 106. The first hard layer 106 increases a hardness of the cylindrical capacitor 100 and compensates for a hardness loss of the cylindrical capacitor 100 owing to the inclusion of the oxidized surface portions 104. With the inclusion of the first hard layer 106, a thickness T1 of each one of the oxidized surface portions 104 can be in a desirable range that is not too small to cause a current leakage of the cylindrical capacitor 100 and is not too large to cause a structural collapse of the cylindrical capacitor 100. Specifically, the structural collapse may happen when the hardness mismatch between the oxidized surface portions 104 and the first metal-containing layers 105 is too large. In addition to reducing the current leakage and improving the structural hardness, the inclusion of the first hard layer 106 suggests the possibility of having a larger thickness T1 of each one of the oxidized surface portions 104 which can be formed at a higher temperature in an ozone treatment described below. When the thickness T1 of each one of the oxidized surface portions 104 is formed at a higher temperature, the capacitance of the cylindrical capacitor 100 can increase. The oxidized surface portions 104, the first metal-containing layers 105, and the first hard layer 106 are described in detail in the following embodiments.

The oxidized surface portions 104 are oxidized portions of the first electrode 101 at the cylindrical surfaces 107 of the hollow cylinder of the first electrode 101. The oxidized surface portions 104 prevent oxygen atoms in the dielectric layer 102 from migrating from the dielectric layer 102 to the first metal-containing layers 105. Once the oxygen atoms leave the dielectric layer 102, the vacancies originally occupied by the oxygen atoms in the dielectric layer 102 would cause the current leakage of the cylindrical capacitor 100. In some embodiments, the oxidized surface portions 104 are in direct contact with the dielectric layer 102, and the first metal-containing layers 105 and the first hard layer 106 are separated from the dielectric layer 102 by the oxidized surface portions 104. In some embodiments, the oxidized surface portions 104 include an inner oxidized surface portion 104A at an inner cylindrical surface 107A of the cylindrical surfaces 107 and an outer oxidized surface portion 104B at an outer cylindrical surface 107B of the cylindrical surfaces 107. In some embodiments, the thickness T1 of each one of the oxidized surface portions 104 is preferably from 5 Å to 10 Å (i.e., the thickness T1 of the inner oxidized surface portion 104A and the thickness T1 of the outer oxidized surface portion 104B are each preferably from 5 Å to 10 Å), for example, 5 Å, 6 Å, 7 Å, 8 Å, 9 Å, or 10 Å. In some embodiments, the oxidized surface portions 104 preferably include titanium oxynitride, titanium oxide, titanium silicon oxynitride, or combinations thereof.

The first metal-containing layers 105 are between the oxidized surface portions 104 and wrapped by the oxidized surface portions 104. In some embodiments, the first metal-containing layers 105 include an inner first metal-containing layer 105A in direct contact with the inner oxidized surface portion 104A and an outer first metal-containing layer 105B in direct contact with the outer oxidized surface portion 104B. In the embodiments that the first hard layer 106 includes a plurality of sublayers, the first metal-containing layers 105 may further include intermediate first metal-containing layer 105C between these sublayers, such that the sublayers are separated from each other by the intermediate first metal-containing layer 105C. For example, in FIG. 1B, three sublayers of the first hard layer 106, including a first sublayer 106a, a second sublayer 106b, and a third sublayer 106c, are provided and the three sublayers are separated from each other by two intermediate first metal-containing layers. In some embodiments, the first metal-containing layers 105 preferably include titanium nitride, titanium silicon nitride, or a combination thereof.

The first hard layer 106 is disposed between the first metal-containing layers 105 and wrapped by the first metal-containing layers 105. The first hard layer 106 is a doping region of the first electrode 101 with a material of the first hard layer 106 different from materials of the first metal-containing layers 105. In other words, physical interfaces are present between the first hard layer 106 and the first metal-containing layers 105. The material of the first hard layer 106 increases the hardness of the cylindrical capacitor 100. In some embodiments, the hardness of the first hard layer 106 is larger than the hardnesses of the first metal-containing layers 105 and the oxidized surface portions 104. In some embodiments, the hardness of the first hard layer 106 is from 9 GPa to 13 GPa, the hardness of each one of the first metal-containing layers 105 is from 8.5 GPa to 12.5 GPA, and the hardness of each one of the oxidized surface portions is from 0.35 GPA to 0.75 GPA. In some embodiments, the first hard layer 106 preferably includes a silicon layer, a carbon layer, an aluminium layer, or combinations thereof. In some embodiment, the first hard layer 106 is conductive.

In some embodiments, the first hard layer 106 may include more than one sublayer, and the description of the first hard layer 106 provided above (e.g., the hardness range, the material, and so on) applies to each sublayer. In some embodiments, the number of the sublayer is any integral in a range from 1 to 12 to modulate the hardness of the cylindrical capacitor 100 finely. In some embodiments, the number of the sublayer is any integral in a range from 1 to 6 to modulate the hardness of the cylindrical capacitor 100 more efficiently. In some embodiments, these sublayers are separated from each other.

In some embodiments, a thickness T2 of each sublayer of the first hard layer 106 is preferably from 0.5 Å to 2 Å, for example, 0.5 Å, 1.0 Å, 1.5 Å, or 2 Å. In some embodiments, a ratio of the thickness of the first hard layer 106 (or a total thickness of the sublayers) to a total thickness of the oxidized surface portions 104 and the first metal-containing layers 105 is preferably from 0.02 to 0.3, for example, 0.02, 0.04, 0.06, 0.08, 0.1, 0.15, 0.2, 0.25, or 0.3, to provide enough hardness of the cylindrical capacitor 100 and to avoid the first hard layer 106 occupying too much portion of the first electrode 101 to affect the function of the oxidized surface portions 104 and the first metal-containing layers 105.

In some embodiments, the first hard layer 106 is separated from the oxidized surface portions 104 by the first metal-containing layers 105, such that the first hard layer 106 is avoided from being oxidized to lose the hardness. In some embodiments, the first hard layer 106 (or each sublayer) is preferably away from the cylindrical surfaces 107 of the hollow cylinder of the first electrode 101 with distances D1, and the distances D1 are from 0.4 to 0.6 times a thickness T3 of the first electrode 101, for example, 0.4 times, 0.45 times, 0.5 times, 0.55 times, and 0.6 times of the thickness T3 of the first electrode 101. For example, in FIG. 1B, the first sublayer 106a may be away from the inner cylindrical surfaces 107A with the distance D1 that is 0.4 times the thickness T3 of the first electrode 101 and away from the outer cylindrical surfaces 107B with the distance D1 that is 0.55 times the thickness T3 of the first electrode 101. In some embodiments, the thickness T3 of the first electrode 101 is preferably from 40 Å to 100 Å, for example, 40 Å, 50 Å, 60 Å, 70 Å, 80 Å, 90 Å, or 100 Å.

The dielectric layer 102 is disposed on the first electrode 101. The dielectric layer 102 is disposed between the first electrode 101 and the second electrode 103 to store charges and increase the capacitance of the cylindrical capacitor 100. In some embodiments, the dielectric layer 102 includes an inner dielectric layer 102A disposed on the inner oxidized surface portion 104A in a hollow cylindrical shape and an outer dielectric layer 102B disposed on the outer oxidized surface portion 104B in a hollow cylindrical shape. In some embodiments, the dielectric layer 102 includes and is not limited to hafnium zirconium oxide, zirconium oxide, hafnium oxide, aluminum oxide, rhodium oxide, ruthenium oxide, or combinations thereof.

The second electrode 103 is disposed on the dielectric layer 102 and may be referred to as a top electrode of the cylindrical capacitor 100. In some embodiments, the second electrode 103 includes an inner second electrode 103A having a shape of a cylinder disposed on the inner dielectric layer 102A and an outer second electrode 103B having a shape of a hollow cylinder disposed on the outer dielectric layer 102B. In some embodiments, the second electrode 103 includes second metal-containing layers 108. In some embodiments, the second metal-containing layers 108 include inner second metal-containing layers 108A in the inner second electrode 103A and outer second metal-containing layers 108B in the outer second electrode 103B. In some embodiments, the second metal-containing layers 108 preferably include titanium nitride, titanium silicon nitride, or a combination thereof. In some embodiments, the second electrode 103 further includes a second hard layer 109 disposed between the second metal-containing layers 108 to increase the hardness of the cylindrical capacitor 100. In some embodiments, the second hard layer 109 includes an inner second hard layer 109A disposed between the inner second metal-containing layers 108A in a hollow cylindrical shape and an outer second hard layer 109B disposed between the outer second metal-containing layers 108B in a hollow cylindrical shape. The second hard layer 109 is a doping region of the second electrode 103 with a material of the second hard layer 109 different from materials of the second metal-containing layers 108. In other words, physical interfaces are present between the second hard layer 109 and the second metal-containing layers 108. In some embodiments, the hardness of the second hard layer 109 is larger than the hardnesses of the second metal-containing layers 108. In some embodiments, the hardness of the second hard layer 109 is from 9 GPa to 13 GPa, and the hardness of each one of the second metal-containing layers 108 is from 8.5 GPa to 12.5 GPA. In some embodiments, the second hard layer 109 preferably includes a silicon layer, a carbon layer, an aluminium layer, or combinations thereof. In some embodiments, the second hard layer 109 is conductive. In some embodiments, the second electrode 103 further includes an outer oxidized surface portion 110 in a hollow cylindrical shape at an outer cylindrical surface 111B of the hollow cylinder of the outer second electrode 103B to improve the quality of the cylindrical capacitor 100. In some embodiments, the outer oxidized surface portion 110 preferably includes titanium oxynitride, titanium oxide, titanium silicon oxynitride, or combinations thereof.

In some embodiments, although not drawn in the figures, the inner second hard layer 109A may include more than one sublayer, the outer second hard layer 109B may include more than one sublayer, and the description of the second hard layer 109 provided above (e.g., the hardness range, the material, and so on) applies to each sublayer in the inner second hard layer 109A and the outer second hard layer 109B. In some embodiments, the number of the sublayer in the inner second hard layer 109A (or the number of the sublayer in the outer second hard layer 109B) is any integral in a range from 1 to 12 to modulate the hardness of the cylindrical capacitor 100 finely. In some embodiments, the number of the sublayer in the inner second hard layer 109A (or the number of the sublayer in the outer second hard layer 109B) is any integral in a range from 1 to 6 to modulate the hardness of the cylindrical capacitor 100 more efficiently. In some embodiments, although not drawn in the figures, these sublayers are separated from each other. On the contrary, the embodiment of FIG. 1B shows the inner second hard layer 109A being only one sublayer and the outer second hard layer 109B being only one sublayer. In some embodiments, a thickness T4 of each sublayer of the inner second hard layer 109A is preferably from 0.5 Å to 2 Å, for example, 0.5 Å, 1.0 Å, 1.5 Å, or 2 Å. In some embodiments, a thickness T5 of each sublayer of the outer second hard layer 109B) is preferably from 0.5 Å to 2 Å, for example, 0.5 Å, 1.0 Å, 1.5 Å, or 2 Å.

In some embodiments, a ratio of the thickness of the outer second hard layer 109B (or a total thickness of the sublayers of the outer second hard layer 109B) to a total thickness of the outer oxidized surface portion 110 and the outer second metal-containing layers 108B is preferably from 0.02 to 0.3, for example, 0.02, 0.04, 0.06, 0.08, 0.1, 0.15, 0.2, 0.25, or 0.3, to provide enough hardness of the cylindrical capacitor 100 and to avoid the outer second hard layer 109B occupying too much portion of the outer second electrode 103B to affect the function of the outer oxidized surface portion 110 and the outer second metal-containing layers 108B.

In some embodiments, the outer second hard layer 109B is separated from the outer oxidized surface portion 110 by the outer second metal-containing layers 108B, such that the outer second hard layer 109B is avoided from being oxidized to lose the hardness. In some embodiments, the outer second hard layer 109B (or each sublayer of the outer second hard layer 109B) is preferably away from cylindrical surfaces 111 (including the inner cylindrical surface 111A and the outer cylindrical surface 111B) of the hollow cylinder of the outer second electrode 103B with distances D2, and the distances D2 are from 0.4 to 0.6 times a thickness T6 of the outer second electrode 103B, for example, 0.4 times, 0.45 times, 0.5 times, 0.55 times, and 0.6 times of the thickness T6 of the outer second electrode 103B. In some embodiments, the thickness T6 of the outer second electrode 103B is preferably from 40 Å to 100 Å, for example, 40 Å, 50 Å, 60 Å, 70 Å, 80 Å, 90 Å, or 100 Å.

The present disclosure also provides a method 200 of forming the cylindrical capacitor 100 described above. The method 200 includes the operations shown in FIG. 2. A first electrode 101 is formed and forming the first electrode 101 includes forming first electrode material layers 113 and the first hard layer 106 stacking with each other in hollow cylindrical shapes, in which the first hard layer 106 is disposed between the first electrode material layers 113; and performing an ozone treatment on exposed cylindrical surface portions 114 of the first electrode material layers 113 to transform the exposed cylindrical surface portions 114 to the oxidized surface portions 104, in which the hardness of the first hard layer 106 is larger than hardnesses of the first electrode material layers 113 and the oxidized surface portions 104. The dielectric layer 102 is formed on the oxidized surface portions 104. The second electrode 103 is formed on the dielectric layer 102. The method 200 is described in detail in the following embodiments.

In an operation 201 (see FIGS. 3 to 6), the first electrode 101 is formed. Forming the first electrode 101 includes alternately forming the first electrode material layers 113 and the first hard layer 106, such that the first electrode material layers 113 and the first hard layer 106 are stacked together. The first electrode material layers 113 are substantially the same as the first metal-containing layers 105 described above, except that portions (e.g., the exposed cylindrical surface portions 114 described below) of the first electrode material layers 113 are transformed into the oxidized surface portions 104 in the following operation. In some embodiments, forming the first electrode material layers 113 and the first hard layer 106 include forming the first electrode material layers 113 and the first hard layer 106 on a cylinder substrate 115, such that the first electrode material layers 113 and the first hard layer 106 can be formed in the hollow cylindrical shapes. In some embodiments, each one of the first electrode material layers 113 and the first hard layer 106 are conformally formed on the cylinder substrate 115. In some embodiments, forming the first electrode material layers 113 and the first hard layer 106 includes any suitable deposition method, for example, atomic layer deposition (ALD). In some embodiments, before performing the ozone treatment described below, a ratio of a thickness of the first hard layer 106 (or a total thickness of the sublayers of the first hard layer 106 described above) to a total thickness of the first electrode material layers 113 is from 0.02 to 0.3, for example, 0.02, 0.04, 0.06, 0.08, 0.1, 0.15, 0.2, 0.25, or 0.3. In some embodiments, the method 200 further includes removing the cylinder substrate 115 before performing the ozone treatment. In some embodiments, removing the cylinder substrate 115 includes any suitable etching method, for example, a wet etching method or a dry etching method.

Next, in some embodiments, the ozone treatment is performed on the exposed cylindrical surface portions 114 (displayed in regions defined by dash lines in FIG. 5) of the first electrode material layers 113 to transform the exposed cylindrical surface portions 114 to the oxidized surface portions 104. After the ozone treatment, the first electrode 101 described above is formed, for example, the embodiment of the first electrode 101 described in FIG. 1B. The detailed embodiments of the first electrode 101 can be referred to in the description provided above. In some embodiments, the ozone treatment is performed by using ozone, and a density of the ozone is preferably from 200 $g/m^3$ to 300 $g/m^3$, for example, 200 $g/m^3$, 250 $g/m^3$, or 300 $g/m^3$, to efficiently form the desired thickness T1 of each one of the oxidized surface portions 104. In some embodiments, the ozone treatment is preferably performed at a temperature from 220° C. to 270° C., for example, 220° C., 230° C., 240° C., 250° C., 260° C., or 270° C., to efficiently form the desired thickness T1 of each one of the oxidized surface portions 104. The foregoing range of the temperature can also improve the crystallization of the dielectric layer 102 formed in the following operation, such that the capacitance of the cylindrical capacitor 100 can increase. In some embodiments, the ozone treatment is performed at a more preferably temperature from 220° C. to 245° C., for example, 220° C., 225° C., 230° C., 235° C., 240° C., or 245° C., such that the capacitance of the cylindrical capacitor 100 is satisfying and the formed thickness T1 of each one of the oxidized surface portions 104 is not too thick to reduce the hardness of the cylindrical capacitor 100.

Figure 7:
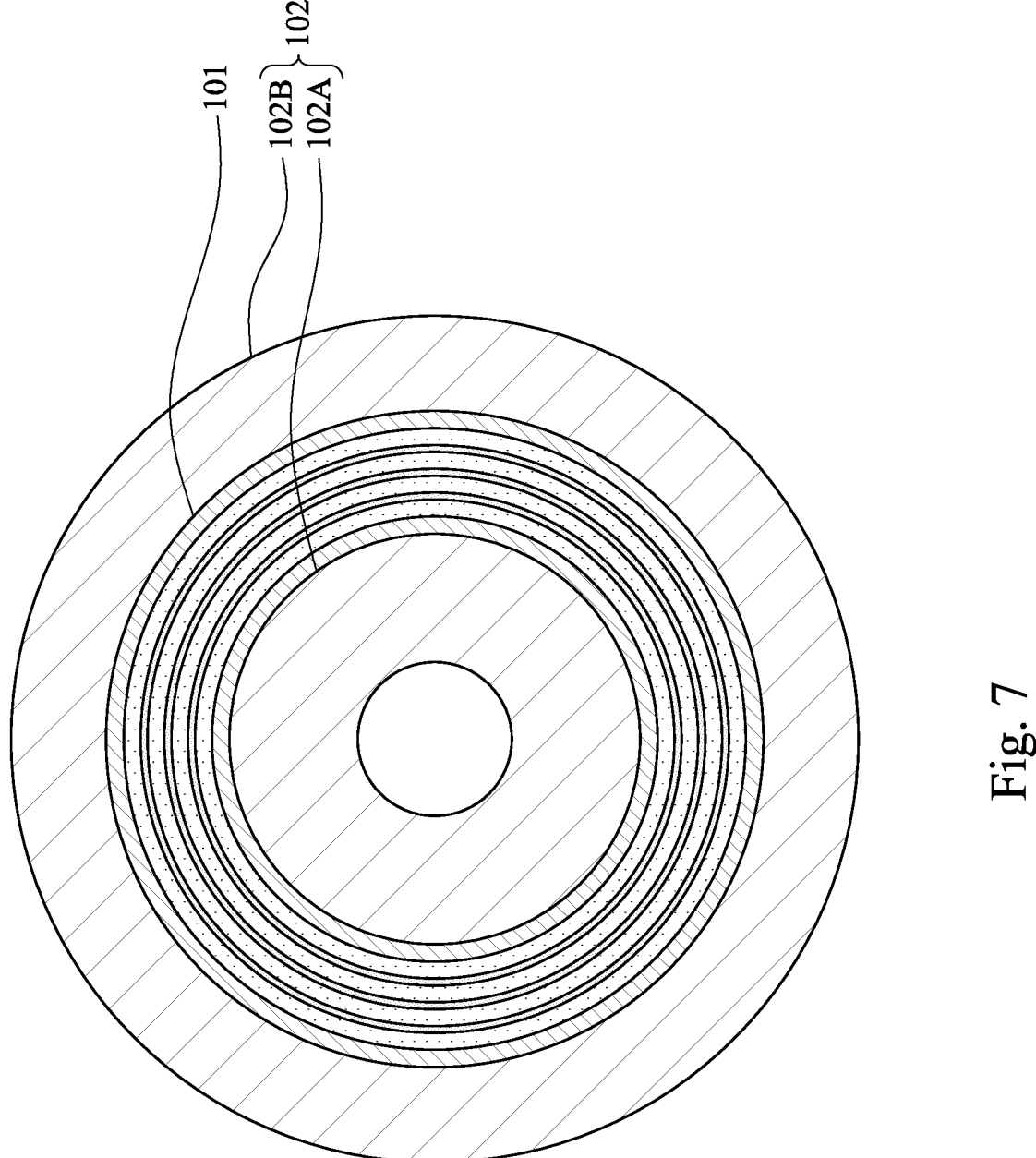

In an operation 202 (see FIG. 7), the dielectric layer 102 is formed on the oxidized surface portions 104 of the first electrode 101. In some embodiments, the dielectric layer 102 is conformally formed on the cylindrical surfaces of the hollow cylinder of the first electrode 101. In some embodiments, forming the dielectric layer 102 includes any suitable deposition method, for example, atomic layer deposition (ALD). After the operation 202, the dielectric layer 102 described above is formed, for example, the embodiment of the dielectric layer 102 described in FIG. 1B. The detailed embodiments of the dielectric layer 102 can be referred to in the description provided above.

Figure 8:
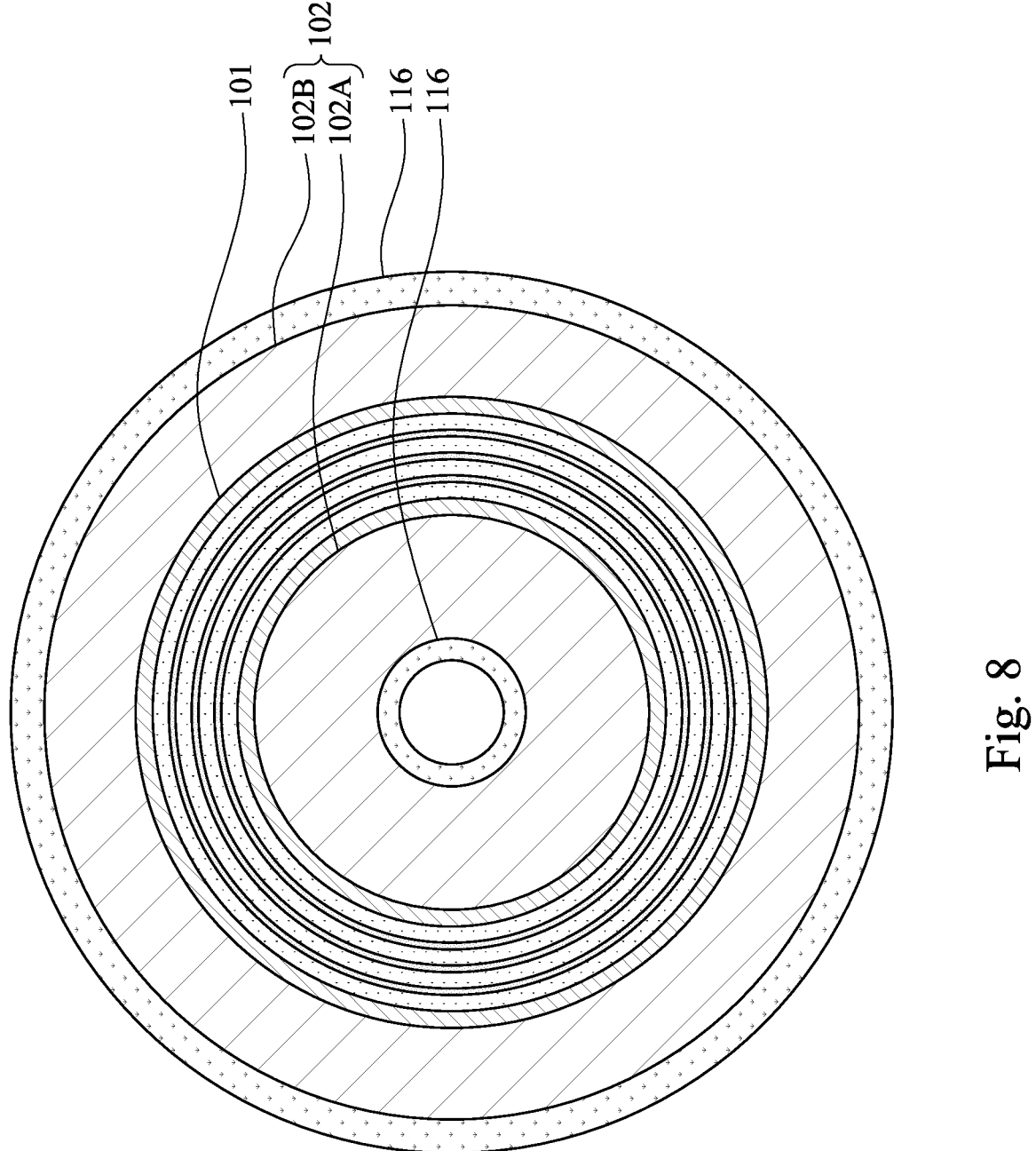
Figure 9:
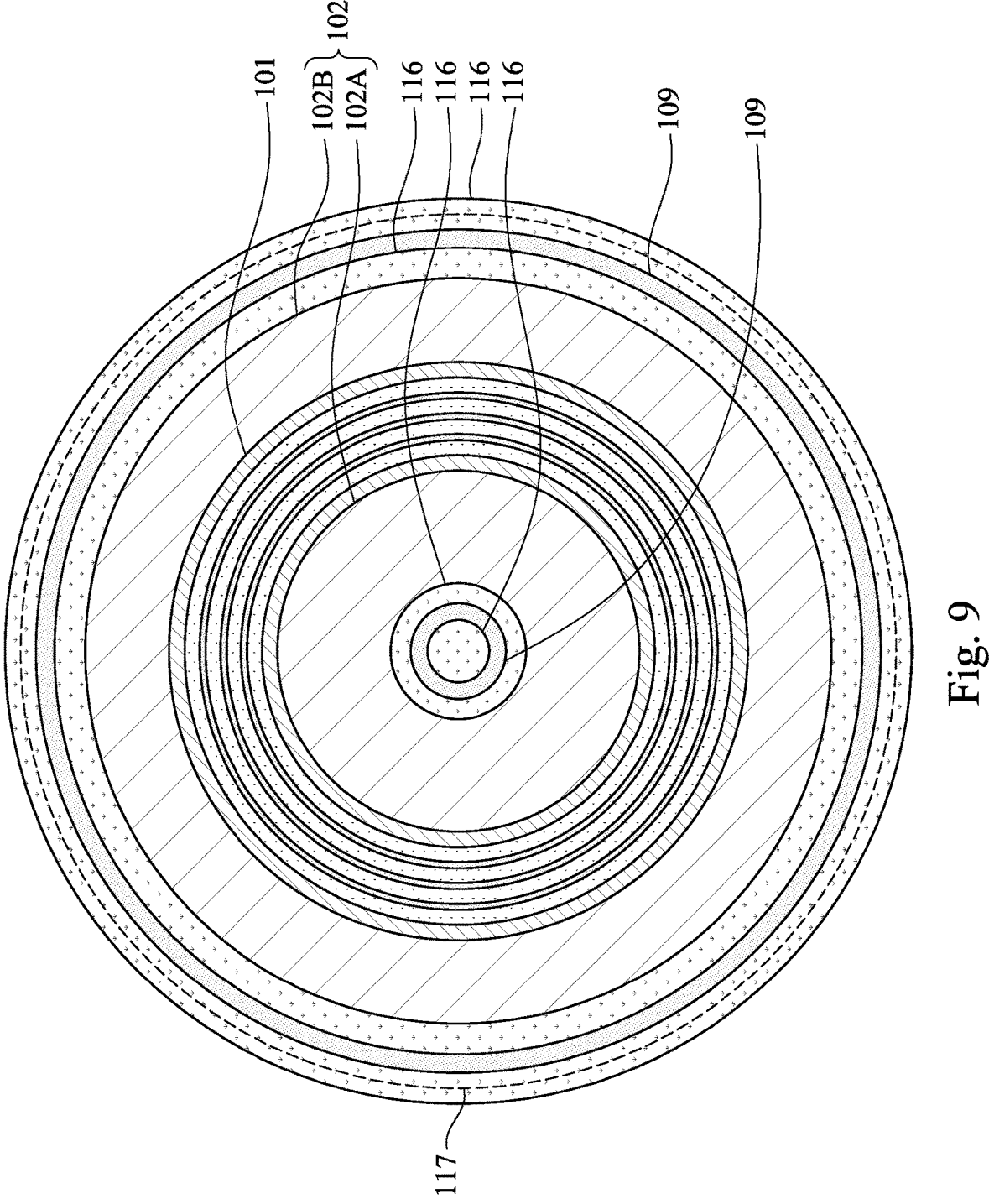

In an operation 203 (see FIGS. 8 to 9), the second electrode 103 is formed on the dielectric layer 102. In some embodiments, forming the second electrode 103 includes alternately forming second electrode material layers 116 and the second hard layer 109 on the dielectric layer 102. The second electrode material layers 116 are substantially the same as the second metal-containing layers 108 described above, except that a portion (e.g., an exposed cylindrical surface portion 117 described below) of the second electrode material layers 116 is transformed into the outer oxidized surface portion 110 in the following operation. In some embodiments, the second electrode material layers 116 and the second hard layer 109 are conformally formed on the dielectric layer 102. In some embodiments, forming the second electrode material layers 116 and the second hard layer 109 includes any suitable deposition method, for example, atomic layer deposition (ALD). In some embodiments, forming the second electrode 103 further includes oxidizing the exposed cylindrical surface portion 117 (displayed in regions defined by a dash line in FIG. 9) of the second electrode material layers 116 after forming the second electrode material layers 116 and the second hard layer 109 to transform the exposed cylindrical surface portion 117 to the outer oxidized surface portion 110. Therefore, after the foregoing operation, the cylindrical capacitor 100 including the second electrode 103 described above is formed, for example, the embodiment of the cylindrical capacitor 100 described in FIG. 1B. The detailed embodiments of the second electrode 103 can be referred to in the description provided above.

Some detailed embodiments, including an Embodiment 1, an Embodiment 2, and an Embodiment 3, are provided below. It is noted that the detailed embodiments are provided for a better understanding of the present disclosure and are not intended to limit the present disclosure. The first electrodes 101, the dielectric layers 102, and the second electrodes 103 of the cylindrical capacitors 100 formed in the Embodiment 1, the Embodiment 2, and the Embodiment 3 are substantially the same, except that the thicknesses T1 of the oxidized surface portions 104 in the first electrodes 101 and the temperatures used in the ozone treatment are different, such that the performance (e.g., the capacitances) of the cylindrical capacitors 100 may be different. The results are summarized in Table 1 below. In Table 1, the temperatures used in the ozone treatment and the formed thickness T1 of the oxidized surface portion 104 in the first electrode 101 are provided. The capacitance per cylindrical capacitor 100 measured in each one of the Embodiment 1, the Embodiment 2, and the Embodiment 3 is satisfying as shown in Table 1. However, the error rate of the cylindrical capacitor 100 significantly increases with the thickness T1 increases. The error rate was measured as a possibility of finding a cylindrical capacitor 100 collapsed owing to a weak hardness. For a better understanding of the comparisons of the Embodiment 1, the Embodiment 2, and the Embodiment 3, the error rates are displayed as relative error rates respective to the error rate found in the Embodiment 3.

TABLE 1

| | Embodiment 1 | Embodiment 2 | Embodiment 3 |
|---|---|---|---|
| Temperature (° C.) | 230 | 240 | 250 |
| Thickness T1 (Å) | 8.35 | 8.94 | 9.24 |
| Capacitance (farad) | 8.82 | 9.03 | 9.11 |
| Relative Error Rate (%) | 6.14 | 29.60 | 100 |

The cylindrical capacitor and the method of forming the same provided in the present disclosure reduce the current leakage of the cylindrical capacitor, avoid the structural collapse of the cylindrical capacitor by improving the hardness of the cylindrical capacitor, and increase the capacitance of the cylindrical capacitor.

The present disclosure is described in considerable detail in some embodiments, but other embodiments may also be feasible, so the description of the embodiments in the present disclosure is not intended to limit the scope and spirit of the claims attached. For one skilled in the art, the present disclosure may be modified and changed without deviating from the scope and spirit of the present disclosure. Such modifications and changes are intended to be covered by the present disclosure when they belong to the scope and spirit of the attached claims.

What is claimed is:

1. A cylindrical capacitor, comprising:
a first electrode having a shape of a hollow cylinder, wherein the first electrode comprises:
oxidized surface portions at cylindrical surfaces of the hollow cylinder of the first electrode;
first metal-containing layers between the oxidized surface portions; and
a first hard layer disposed between the first metal-containing layers, and a hardness of the first hard layer is larger than hardnesses of the oxidized surface portions and the first metal-containing layers;
a dielectric layer disposed on the first electrode; and
a second electrode disposed on the dielectric layer.

2. The cylindrical capacitor of claim 1, wherein the first hard layer comprises at least one selected from the group consisting of a silicon layer, a carbon layer, and an aluminum layer.

3. The cylindrical capacitor of claim 1, wherein the first metal-containing layers comprise at least one selected from the group consisting of titanium nitride and titanium silicon nitride, and the oxidized surface portions comprise at least one selected from the group consisting of titanium oxynitride, titanium oxide, and titanium silicon oxynitride.

4. The cylindrical capacitor of claim 1, wherein the first hard layer is away from the cylindrical surfaces of the hollow cylinder of the first electrode with distances which are from 0.4 to 0.6 times a thickness of the first electrode.

5. The cylindrical capacitor of claim 4, wherein the thickness of the first electrode is from 40 Å to 100 Å.

6. The cylindrical capacitor of claim 1, wherein a ratio of a thickness of the first hard layer to a total thickness of the oxidized surface portions and the first metal-containing layers is from 0.02 to 0.3.

7. The cylindrical capacitor of claim 1, wherein the first hard layer is separated from the oxidized surface portions by the first metal-containing layers.

8. The cylindrical capacitor of claim 1, wherein the oxidized surface portions are in direct contact with the dielectric layer, and the first metal-containing layers and the first hard layer are separated from the dielectric layer by the oxidized surface portions.

9. The cylindrical capacitor of claim 1, wherein a thickness of each of the oxidized surface portions is from 5 Å to 10 Å.

10. The cylindrical capacitor of claim 1, wherein the second electrode comprises second metal-containing layers and a second hard layer between the second metal-containing layers, and a hardness of the second hard layer is larger than hardnesses of the second metal-containing layers.

* * * * *